Figures 1, 2:
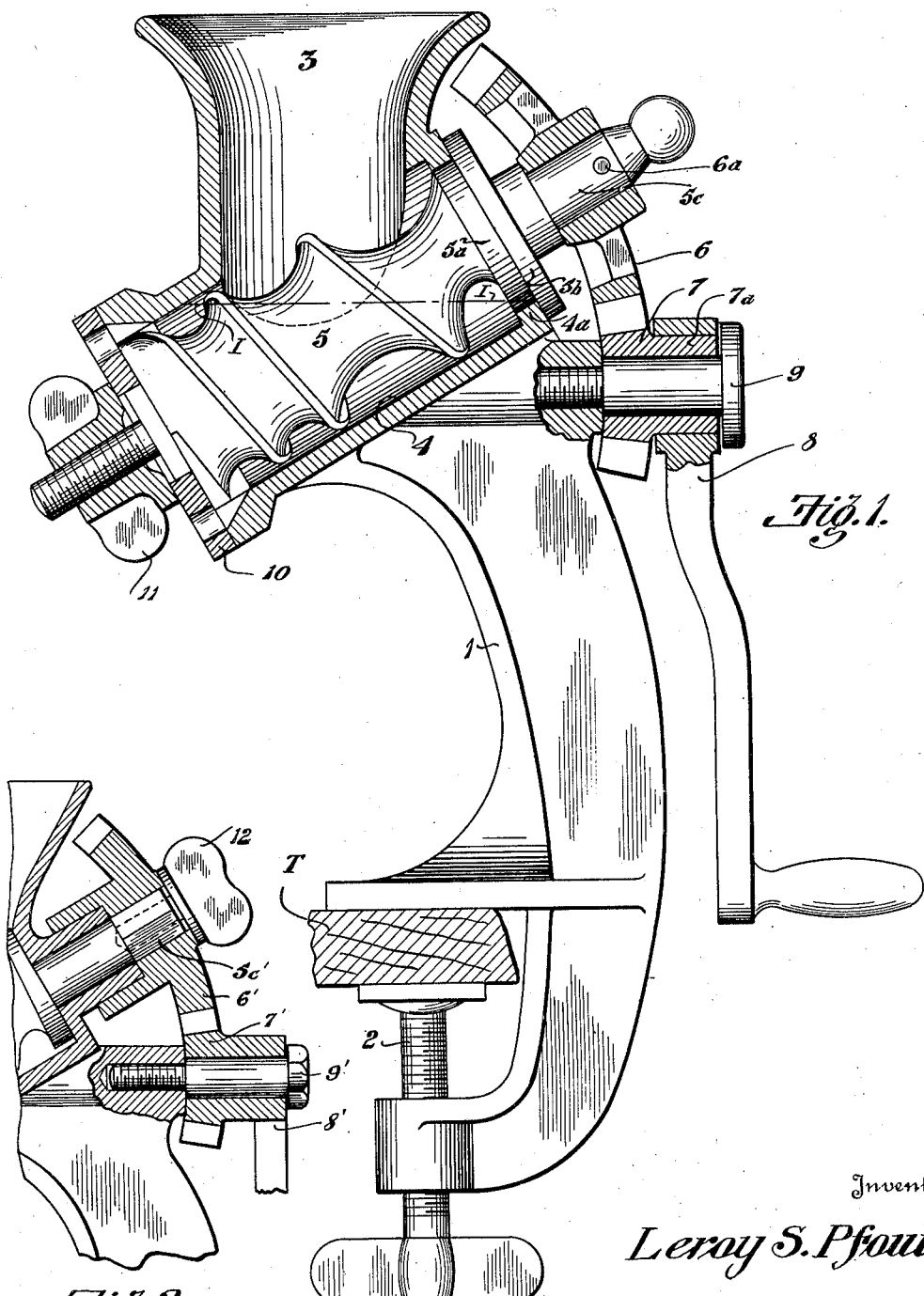

July 14, 1925.  
L. S. PFOUTS  
FOOD CHOPPER  
Filed Aug. 26, 1924

1,545,514

Inventor  
Leroy S. Pfouts.  
By Frease and Bond  
Attorneys

Patented July 14, 1925.

1,545,514

UNITED STATES PATENT OFFICE.

LEROY S. PFOUTS, OF CANTON, OHIO.

FOOD CHOPPER.

Application filed August 26, 1924. Serial No. 734,216.

*To all whom it may concern:*

Be it known that I, LEROY S. PFOUTS, a citizen of the United States, residing at Canton, in the county of Stark and State of Ohio, have invented new and useful Improvements in Food Choppers, of which the following is a specification.

The invention relates to food choppers wherein food inserted in a feed chamber is forced by means of a rotating screw through apertures in a cutting disk.

Choppers of this character are usually of small, hand-crank driven, portable size for clamping on the edge of a table; and difficulties have been found in securing a proper feeding of the food through the feed chamber; in preventing the juices squeezed out of the food by the feeding action from dripping out of the feed chamber upon the hands of the operator, and upon the table top and the floor; and in securing sufficient torque on the feed screw without undue exertion by the operator.

These difficulties are overcome by the present invention, and the objects of the improvements are to provide a food chopper in which the material feeds easily through the feed chamber, in which the juices squeezed out of the food by the feeding action are all conserved and delivered into the receiving vessel provided for the chopped food, and in which ample torque may be applied to the feed screw by slight exertion of the operator on the crank handle. These objects are simultaneously attained by inclining the axis of the feed chamber and feed screw downward toward the discharge end, and bevel-gearing the feed screw to the crank, the crank axis being horizontal for easy turning of the crank in the usual manner.

The invention is illustrated in the accompanying drawing forming part hereof, in which—

Figure 1 is an elevation of the improved food chopper, portions of the chopper mechanism being shown in section; and Fig. 2, a fragmentary elevation, with portions in section, of a modified form of the improved food chopper.

Similar numerals refer to similar parts throughout the drawing.

The food chopper includes a frame indicated at 1, which is provided at its lower end with a clamp indicated at 2 for securely fastening the chopper to a table top T.

The chopper mechanism is carried at the upper end of the frame and includes an upright food receiving hopper 3, opening downward into a cylindric feed chamber 4, the axis of the feed chamber being inclined downward toward the discharge end at an angle with the horizontal, and the upper end of the chamber being provided with a thrust bearing flange 4ª.

A feed screw 5, provided with bearing 5ª, and thrust collar 5ᵇ, is rotatably mounted in the feed chamber, the bearing and the collar being seated upon the thrust bearing flange 4ª of the chamber.

At the upper end of the feed screw, a gear shaft 5ᶜ is provided, and a bevel gear wheel 6 is secured to the shaft by means of a pin 6ª. The gear wheel 6 is in mesh with a smaller bevel gear pinion 7, thus forming a power increasing gearing.

The gear pinion 7 has an outwardly projecting crank bearing 7ª, preferably square in cross-section, which carries a suitable slotted crank 8, the crank and pinion being pivotally mounted upon the frame by a shaft bolt 9 whose axis is preferably horizontal.

At the lower end of the feed screw 5 a disk cutter 10 is secured by means of a wing nut 11, in the usual manner, The food chopper illustrated in Fig. 1, is adapted to that type of cutter 10 which permits the feed screw to be removable from the gear end of the feed chamber.

For cutters requiring the feed screw to be removable from the cutter end of the feed chamber, the modified food chopper illustrated in Fig. 2 is adapted, in which the feed screw is provided with a square upper end 5ᶜ' upon which a suitably apertured bevel gear wheel 6' is fitted and secured by means of a wing nut 12. The gear 6' meshes with the shank 7' of an integral crank and gear pinion 8' pivotally mounted to the frame by means of horizontal shaft bolt 9'.

In operation, the level of the juices in the feed chamber would have to reach the level of line I—I in Fig. 1, before any juices would leak out of the crank end of the feed chamber. The downward slope of the feed chamber, however, causes the juices as well as the food, to feed easily downward under the action of gravity and the feed screw through the cutter and into a suitably placed receiving vessel, and the level of the juices in the improved chopper of the present invention never reaches the level of line I—I.

The axis of the feed screw being at an angle with the horizontal, it is possible to bevel-gear the feed screw to the bevel-pinion on the crank, and still maintain a horizontal crank axis at the usual level and without raising the level of the top of the food inlet. It would be impossible to maintain the customary level of the food inlet if the usual crank were geared to the feed screw, and the crank and feed screw axes remained parallel and horizontal.

Thus the angular disposition of the crank and feed screw enables the simultaneous attainment of easy feeding through the chopper, delivery of all juices into the receiving vessel, and ample torque on the feed screw by a moderate amount of exertion on the part of the operator, because of the power increasing gearing.

I claim:

1. A food chopper including a vertical receiving hopper, an inclined feed chamber sloping downward toward its discharge end, a coaxial feed screw operatively mounted in the feed chamber, an operating crank, and gearing operatively connecting the crank with the feed screw, the upper end of the receiving hopper being bell-shaped and forming a guard for said gearing.

2. A food chopper including a receiving hopper, a feed chamber, a coaxial feed screw operatively mounted in the feed chamber, an operating crank, and gearing operatively connecting the crank with the feed screw, the upper end of the receiving hopper being bell-shaped and forming a guard for said gearing.

3. A food chopper including a vertical receiving hopper, an inclined feed chamber sloping downward toward its discharge end, a coaxial feed screw operatively mounted in the feed chamber, an operating crank having a horizontal axis, a pinion upon the operating crank, and a gear upon the feed screw meshing with said pinion, the upper end of the receiving hopper being flared, forming a guard for said gear.

4. A food chopper including a vertical receiving hopper, an inclined feed chamber sloping downward toward its discharge end at greater than a right angle to the hopper, and a coaxial feed screw operatively mounted in the feed chamber.

5. A food chopper including a vertical receiving hopper, an inclined feed chamber sloping downward toward its discharge end, a coaxial feed screw operatively mounted in the feed chamber, an operating crank having a horizontal axis, a pinion upon the operating crank, and a gear upon the feed screw meshing with said pinion.

In testimony that I claim the above, I have hereunto subscribed my name.

LEROY S. PFOUTS.